United States Patent
Noble et al.

(10) Patent No.: US 6,339,271 B1
(45) Date of Patent: Jan. 15, 2002

(54) MOLDED FLYWHEEL MAGNET CAGE

(75) Inventors: Mark Noble, Pleasant Prairie; Charles T. Rogan, Kenosha, both of WI (US); Douglas A. Trudeau, Lake Orion, MI (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/468,582

(22) Filed: Dec. 21, 1999

(51) Int. Cl.[7] .............. H02K 1/27; H02K 1/28; H02K 15/03; H02K 21/22
(52) U.S. Cl. .............. 310/74; 310/42; 310/43; 310/156.21; 310/156.26; 29/598; 74/572
(58) Field of Search .............. 310/72, 42, 43, 310/44, 156, 67 R, 153; 29/596, 598; 74/572

(56) References Cited

U.S. PATENT DOCUMENTS

| | | | | |
|---|---|---|---|---|
| 3,368,275 A | * | 2/1968 | Eberline et al. | 29/598 |
| 4,012,651 A | * | 3/1977 | Burson | 310/153 |
| 4,072,920 A | | 2/1978 | Wright | 335/285 |
| 4,200,078 A | | 4/1980 | Cavil et al. | 123/148 CC |
| 4,219,752 A | * | 8/1980 | Katoi | 310/156 |
| 4,227,105 A | * | 10/1980 | Kumakura | 310/153 |
| 4,275,322 A | | 6/1981 | Cavil et al. | 310/111 |
| 4,276,868 A | | 7/1981 | Burrows et al. | 123/602 |
| 4,433,473 A | * | 2/1984 | Benedetti | 29/598 |
| 4,550,697 A | | 11/1985 | Campen | 123/149 D |
| 4,552,103 A | | 11/1985 | Baltz et al. | 123/186 |
| 4,573,258 A | | 3/1986 | Io et al. | 29/596 |
| 4,591,749 A | | 5/1986 | Gauthier et al. | 310/156 |
| 4,695,261 A | * | 9/1987 | Broughton et al. | 440/900 |
| 4,795,924 A | * | 1/1989 | Kamiyama et al. | 310/67 R |
| 4,877,986 A | | 10/1989 | Shimizu | 310/153 |
| 4,910,861 A | | 3/1990 | Dohogne | 29/598 |
| 4,916,344 A | | 4/1990 | Hammer et al. | 310/154 |
| 4,980,592 A | | 12/1990 | Olmr et al. | 310/153 |
| 5,157,299 A | | 10/1992 | Gerlach | 310/237 |
| 5,329,199 A | | 7/1994 | Yockey et al. | 310/263 |
| 5,367,278 A | | 11/1994 | Yosikawa | 335/285 |
| 5,488,260 A | | 1/1996 | Heyraud | 310/156 |
| 5,498,181 A | | 3/1996 | Anselm et al. | 440/53 |
| 5,687,471 A | | 11/1997 | Noguchi et al. | 29/598 |
| 5,907,206 A | * | 5/1999 | Shiga et al. | 310/156 |
| 5,998,902 A | * | 12/1999 | Sleder et al. | 310/153 |

* cited by examiner

*Primary Examiner*—Burton S. Mullins
(74) *Attorney, Agent, or Firm*—Timothy J. Ziolkowski; Cook & Franke SC

(57) ABSTRACT

A flywheel (20) having a molded cage (30) formed around a plurality of magnets (34) attached to the flywheel (20). The cage (30) extends into one or more grooves (40,42) formed in the flywheel (20) to resist the shrinkage of the cage 30 inside diameter as it cools following an injection molding process. The gap (44) between the cage (30) and magnets (34) and an adjacent stator (32) is precisely controlled and minimized. Shutoff surfaces (36,38,46) formed on the flywheel (20) function as a portion of the die for injection molding of the cage (30).

74 Claims, 2 Drawing Sheets

MOLDED FLYWHEEL MAGNET CAGE

BACKGROUND OF THE INVENTION

This invention relates generally to the field of marine propulsion, and more particularly to an electrical generator for a marine engine, and specifically to a device and method for attaching magnets to the flywheel of a marine engine electrical generator.

It is known to generate electricity by moving a permanent magnet past a stator coil. In the field of marine engines, it is known to attach a plurality of permanent magnets to an inside diameter surface of the flywheel of an engine, and to install a stator proximate the inside diameter surface in order to induce an electrical current in the stator as the magnets are rotated past the stator by the revolution of the flywheel. Such magnets may be attached to the flywheel in a variety of ways. For example, it is known to glue magnets to a flywheel. An adhesive such as an epoxy glue is applied to a magnet and/or flywheel, and the magnet is pressed against the surface of the flywheel while the adhesive hardens. This method leaves the magnet exposed and subject to damage during handling of the flywheel. In addition, corrosion behind the magnets may reduce the bond strength. Alternatively, a magnet may be retained against a flywheel by a metal retaining plate, which in turn, is attached to the flywheel with fasteners. While the retaining plate serves as a protective shield for the magnets, the additional thickness of the plate increases the gap between the magnets and the stator, thereby decreasing the efficiency of the electrical generator.

It is also known to mold a cage around magnets attached to an inside diameter surface of a flywheel. Such a cage forms a protective ring of plastic, fiberglass reinforced nlyon, or other molding material to completely enclose the magnets. A thin metal shim stock is positioned around the inside surface of the flywheel to define the volume of the cage, and liquid molding material is introduced into the volume to surround the magnets. Once hardened, the molding material forms a protective ring encircling the magnets. Similar to the metal retaining plate design described above, however, this design disposes a metal shim stock between the magnets and the stator. Furthermore, the flexibility of the shim stock may cause the inside diameter of the protective ring to be uneven, thereby necessitating an undesirable increase in the design gap between the magnets and the stator.

What is needed is a method and apparatus for retaining magnets on a flywheel that provides protection for and mechanical retention of the magnets without necessitating the need for an increase in the gap between the magnets and the stator.

SUMMARY OF THE INVENTION

An improved flywheel is disclosed herein having: a disk portion; a rim portion attached to the disk portion and having an inside diameter surface; a depression formed in the surface of at least one of the disk portion and the rim portion; a magnet attached to the inside diameter surface; and a cage in contact with a magnet and extending into the depression. The flywheel is further described as having an injection molding shutoff surface formed on at least one of the disk portion and the rim portion of the flywheel proximate an edge of the cage. The injection molding shutoff surface is formed to mate with a male portion of a die during an injection molding process. The depression formed in the flywheel may be a groove formed in the rim portion or the disk portion. The portion of the cage extending into the groove(s) resists the shrinkage of the cage as it cools following the injection molding process, thereby assuring precise control of the cage inside diameter. To further minimize the gap between the magnets and the stator of an electrical generator incorporating this invention, the magnets may be attached to the inside diameter surface of the flywheel by a process that includes the steps of: forming a smooth inside diameter surface on the flywheel; forming a smooth inside diameter surface and opposed smooth outside diameter surface on the magnet; applying adhesive to at least on the magnet outside diameter surface and the flywheel inside diameter surface; pressing the magnet outside diameter surface against the flywheel inside diameter surface with the adhesive therebetween; and holding the magnet inside diameter surface at a predetermined diametrical position while the adhesive hardens.

BRIEF DESCRIPTION OF THE DRAWINGS

The features and advantages of the present invention will become apparent from the following detailed description of the invention when read with the accompanying drawings in which.

Identical components illustrated in more than one Figure are numbered consistently in each Figure.

DETAILED DESCRIPTION OF THE INVENTION

Figure 1:
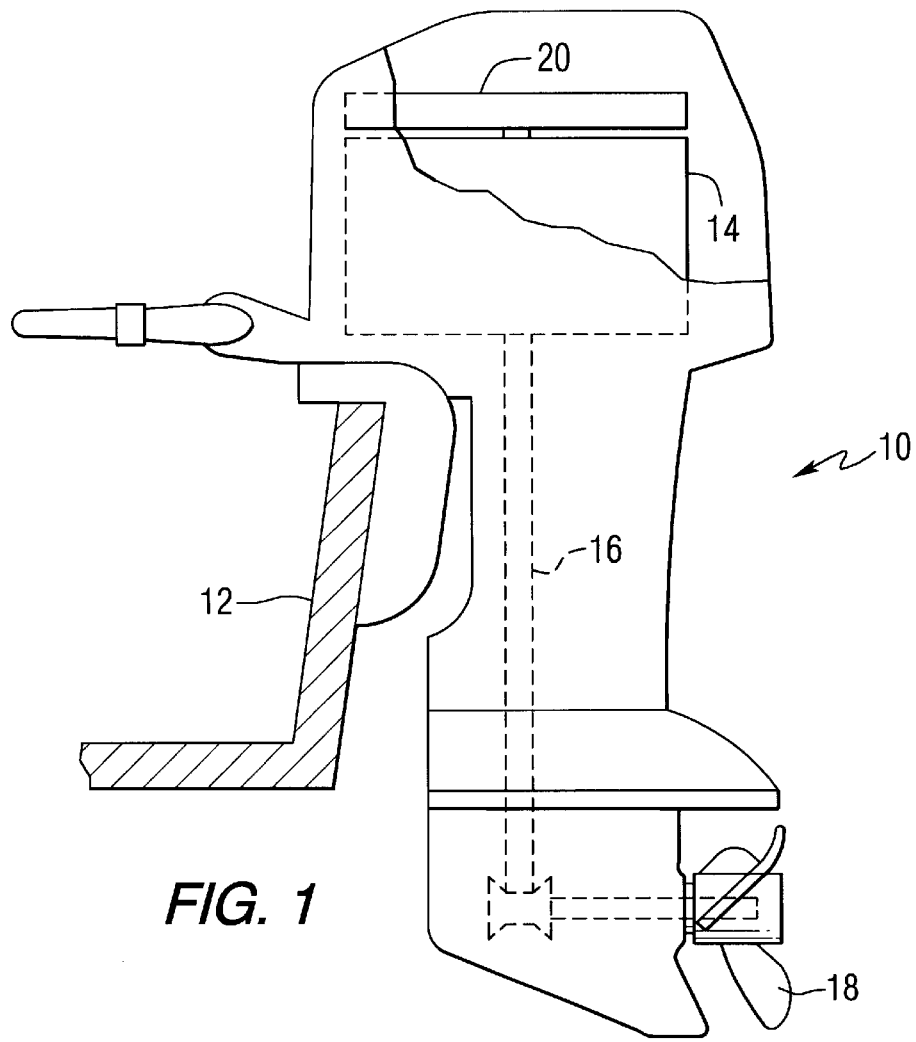
FIG. 1 illustrates a marine engine incorporating a flywheel electrical generator in accordance with the present

FIG. 1 illustrates a marine engine 10 attached to the transom 12 of a watercraft. The marine engine 10 has a power unit 14, typically an internal combustion engine. The power unit 14 is connected by shaft 16 to propeller 18. A flywheel 20 is also connected by shaft 16 to power unit 14 for rotation about its axis during the operation of the marine engine 10. One or more magnets are connected to the flywheel 20 for rotation around a stator (not shown) as will be more fully described below.

Figure 2:
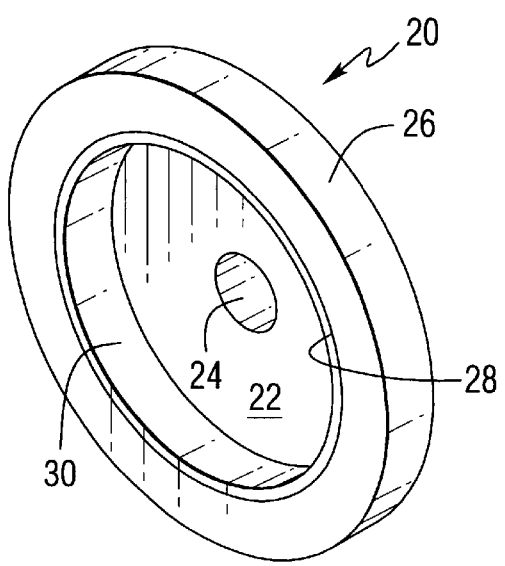
FIG. 2 illustrates a flywheel having a cage formed in accordance with the present invention.

FIG. 2 is a prospective view of the flywheel 20 of FIG. 1. Flywheel 20 includes a disk portion 22 having a hole 24 formed through a central axis thereof for the passage of shaft 16. Flywheel 20 also has a rim portion 26 attached to the disk portion 22 and having an inside diameter surface 28. Disposed against the inside diameter surface 28 is a cage 30 formed to be concentric with the inside diameter surface 28. Disposed within cage 30 are a plurality of magnets (not shown) attached to the inside diameter surface 28 and spaced equally around the circumference of the inside diameter surface 28.

Figure 3:
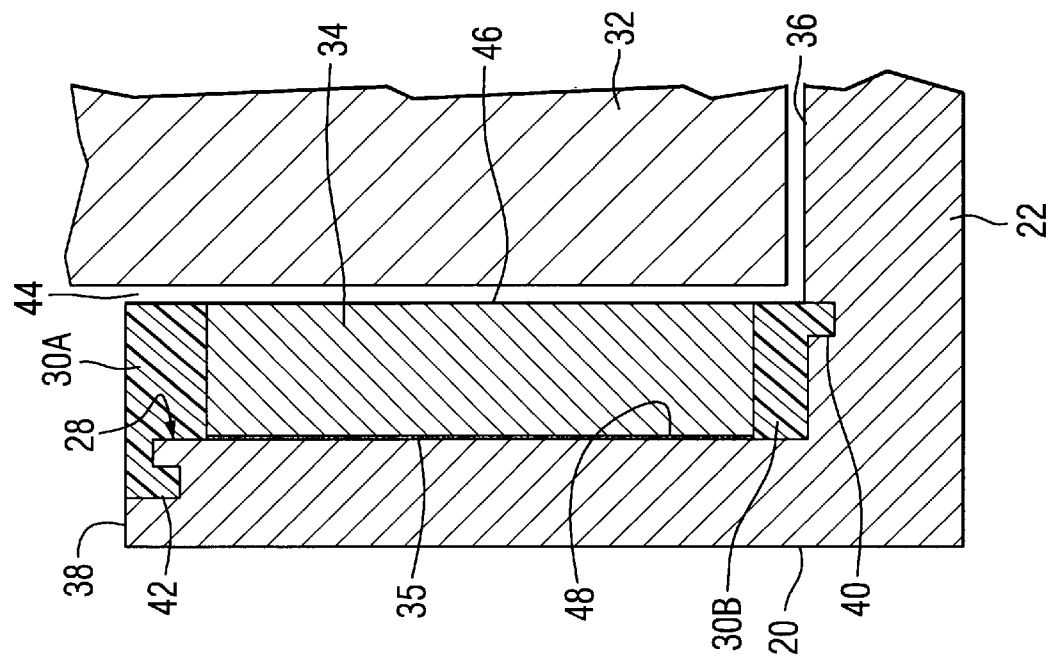
FIG. 3 is a partial cross-sectional view of a flywheel and stator an electrical generator in accordance with the present invention taken at a section through an attached magnet.

FIG. 3 illustrates a partial cross-sectional view of flywheel 20 and the adjacent stator 32 as they may be positioned during the operation of the marine engine 10 of FIG.

1. FIG. 3 illustrates a cross-section through one of the plurality of magnets 32 disposed around the inside diameter surface 28 of flywheel 20. Rim portion 26 is shown attached to and formed integral with disk portion 22. Magnet 32 is attached to the inside diameter surface 28 of rim portion 26 with a thin layer of adhesive 35 therebetween. Cage 30 can be seen as consisting of a top portion 30A disposed above the magnet 34 and bottom portion 30B disposed below magnet 34. Cage 30 is separated from stator 32 by gap 44.

Figure 4:
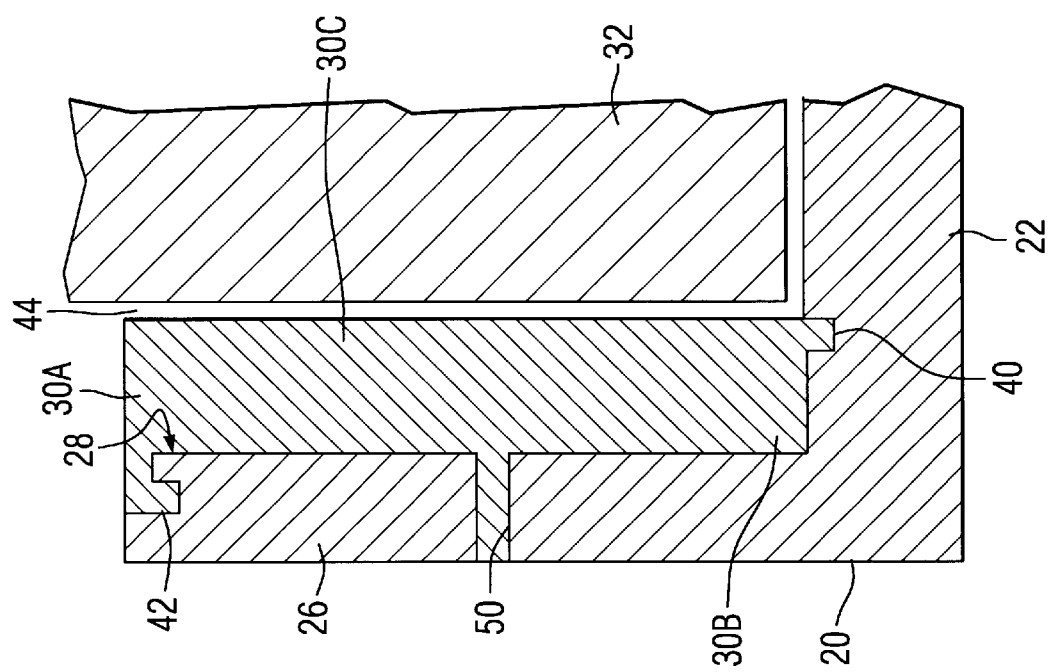
FIG. 4 illustrates a partial cross-sectional view of the device of FIG. 3 as seen at a cross-section between adjacent magnets taken at a section between adjacent attached magnets.

A second cross-section of the same flywheel 20 and stator 32 taken at a second cross-section between adjacent magnets 34 is illustrated in FIG. 4. In this figure, it can be appreciated that the cage 30 includes not only the top portion 30A and bottom portion 30B, but also a middle portion 30C formed along the circumference of the inside diameter 28 between adjacent magnets 34.

The flywheel 20 of FIGS. 3 and 4 may be manufactured by first forming a flywheel blank having the general shape of the flywheel disk 22 and rim portion 26. The inside diameter surface 28 is then machined to be smooth and concentric about a central axis formed through the center of hole 24. A lower injection molding shutoff surface 36 is then machined as a smooth top surface of the disk portion 22. Similarly, an upper injection molding shutoff surface 38 is machined as a smooth top surface of rim portion 26. As will be described more fully below, these shutoff surfaces 36, 38 are formed to function as a female portion of a die to mate with a male portion of a die during an injection molding process used to form cage 30.

Material is also removed from the flywheel blank to form one or more depressions in the surface of flywheel 20. Alternatively, such depressions may be cast into the flywheel blank during its initial fabrication. Such depressions may take the form of an annular groove 40 formed in the disk portion 22, or an annular groove 42 or hole 50 formed in the rim portion 26. Cage 30 is formed to extend into annular grooves 40, 42, thereby anchoring cage 30 against diametrical shrinkage during the cooling of cage 30 following the injection molding process. It may be appreciated that by anchoring the upper portion 30A and lower portion 30B of cage 30 against such diametrical shrinkage, a more precise inside diameter dimension may be maintained on cage 30. Because it is undesirable to have any mechanical interference between cage 30 and stator 32. In order to maximize the magnetic flux passing through the stator during the rotation of magnet 34 while avoiding any rubbing, a precise and minimized gap 44 must be maintained.

Figure 5:
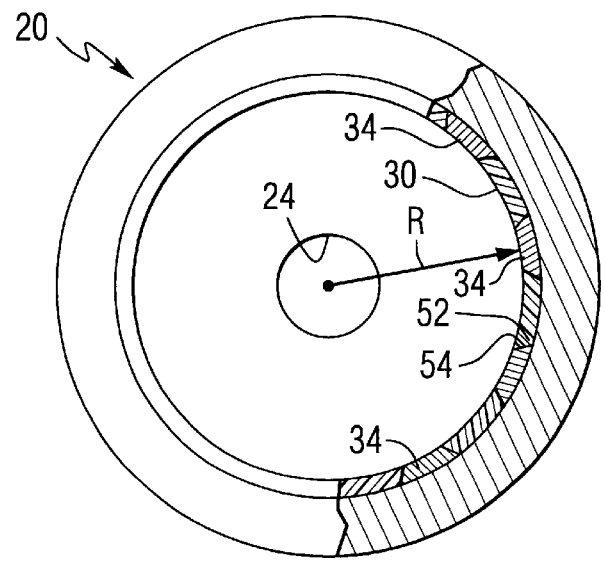
FIG. 5 is a top view of a flywheel in accordance with the present invention with a partial cutout view illustrating bevels formed in the magnets and cage.

Once the flywheel blank has been formed to contain the features illustrated in FIGS. 3 and 4, magnets 34 may be attached to the inside diameter surface 28. The most common prior art technique of attaching such magnets 34 is by the use of glue or another adhesive. Adhesive was applied between the magnet 34 and flywheel inside diameter surface 28, and the magnet 34 was pressed against the flywheel with a predetermined amount of force. The prior art method resulting in an imprecise diametrical position of the magnet due to variations in the amount and location of the adhesive applied between the parts. The inventors have recognized that it is important to precisely locate the inside diameter surface 46 of magnet 34 in order to minimize gap 44. To achieve such a result, a smooth outside diameter surface 48 is first formed on the magnet 34 opposed a smooth inside diameter surface 46. The outside diameter surface 48 of magnet 34 is shaped to fit precisely with the inside diameter surface 28 of the rim portion 26 of the flywheel 20. A predetermined and controlled amount of adhesive is then applied to one or both of the mating surfaces. Magnet 34 is then pressed against the flywheel inside diameter surface 28 with the adhesive being spread therebetween. Unlike prior art processes where a predetermined force is applied to hold the magnet in place, the applicants have found it advantageous to hold the magnet inside diameter surface 46 at a predetermined diametrical position R (as shown in FIG. 5) relative to the axis of the flywheel 20 while the adhesive hardens. In this manner, gap 44 may be maintained with more precision, thereby allowing the design value for the gap 44 to be reduced when compared to prior art devices. An alternative method of controlling the diametrical position of the magnet is to precisely machine the inside diameter of the flywheel and the surfaces of the magnet, then to mix the adhesive with a plurality of very small diameter balls, for example balls ranging from 0.003–0.005 inches or some other predetermined size range. The magnet may then be forced against the flywheel as the adhesive hardens there between, and the distance between the magnet and the flywheel will be controlled by the diameter of the balls.

FIG. 4 also illustrates a hole 50 formed in the rim portion 26 of the flywheel 20. Cage 30 extends into hole 50. It may be appreciated that hole 50 is a second embodiment of a depression formed in the flywheel 20 into which cage 30 extends. The extension of cage 30 into hole 50 provides additional resistance against the rotational movement of cage 30 relative to flywheel inside diameter surface 28. One or more holes may also be used in lieu of or in combination with the grooves 40, 42.

Cage 30 is preferably formed using an injection molding technique. The applicants have found that by maintaining tight tolerances on selected surfaces of the flywheel 20, the flywheel itself may be used as the female portion of a die for the injection molding process. Specifically, shutoff surfaces 36, 38 may be formed to be flat surfaces having tolerances comparable to those used for a female mold, as are known in the art. Similarly, the opposed surfaces 46, 48 of the magnet 34 and the inside diameter surface 28 may be controlled to precise dimensions. In this manner, a die may be placed to come in contact with surfaces 36, 38 to define an injection volume for cage 30. The die may be placed a predetermined distance away from the inside diameter surface 46 of magnet 34 in order to form a predetermined thickness of the cage 30 over surface 46. Alternatively, as illustrated in FIG. 3, the die may be designed to be essentially flush with surface 46 so that there is no flashover of cage material onto surface 46 during the injection molding process. Such a design allows gap 44 between the magnet 34 and the stator 32 to be as small as possible. Cage 30 is then formed by injecting a thermal setting plastic into the injection volume and allowing the plastic to cool to a solid state. The male portion of the die may then be removed and the cage 30 and flywheel blank allowed to cool to room temperature. During this cooling process, the material of cage 30 will tend to shrink as it cools. Such shrinkage of a ring member tends to decrease the radius R of the inside diameter of the cage 30. Such shrinkage is undesirable because it adversely effects the precision to which gap 44 can be maintained. By allow cage 30 to extend into grooves 40, 42 formed in respective top surfaces of the flywheel 20, the respective lower portion 30B and upper portion 30A of cage 30 is restrained from such diametrical shrinkage. The term "top surface" as used herein refers to a surface perpendicular to the axis of rotation of the flywheel, such as surfaces 36, 38 shown in FIGS. 3 and 4. Note that the center section 30C of cage 30 is not restrained by such a notch. However, the shrinkage in this area will cause the cage 30 to increase its radius due to the shrinkage of the material between adjacent magnets 34. Thus, the gap 44 may tend to be slightly wider adjacent the center section 30C of cage 30. Such variation does not increase the risk of contact between stator 32 and flywheel 20, and therefore it is non-problematical.

FIG. 5 is a top view of flywheel 20 with a portion of the rim portion 26 removed in order to illustrate the cross-sectional shape of magnets 34. Magnets 34 are formed to have a beveled edge 54, and the cage 30 is thereby formed to have a beveled surface 52 in contact with the beveled edge 54. This wedge shape acts to provide additional restraint against the movement of the magnets 34 towards the center axis of flywheel 20. These bevels 52,54 will hold the magnet 34 in place in the event that the adhesive bond fails or weakens.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and the scope of the appended claims.

We claim as our invention:

1. A flywheel comprising:
    a disk portion;
    a rim portion attached to the disk portion and having an inside diameter surface;
    a depression formed in the surface of the disk portion;
    a magnet attached to the inside diameter surface; and
    a cage in contact with the magnet and extending into the depression.

2. The flywheel of claim 1, wherein the depression comprises a groove.

3. The flywheel of claim 1, wherein the depression comprises a hole.

4. The flywheel of claim 1, wherein the rim portion further comprises a top surface, and wherein the depression comprises a groove formed in the top surface.

5. The flywheel of claim 1, wherein the disk portion further comprises a top surface, and wherein the depression comprises a groove formed in the top surface.

6. The flywheel of claim 1, wherein the rim portion further comprises a top surface, and wherein the disk portion further comprises a top surface, further comprising:
    a first groove formed in the top surface of the rim portion;
    a second groove formed in the top surface of the disk portion; and
        wherein the cage extends into both the first groove and the second groove.

7. The flywheel of claim 1, further comprising a first groove formed in the rim portion and a second groove formed in the disk portion, and wherein the cage extends into both the first groove and the second groove.

8. The flywheel of claim 1, further comprising an injection molding shutoff surface formed on the disk portion proximate an edge of the cage.

9. The flywheel of claim 1, further comprising an injection molding shutoff surface formed on the rim portion proximate an edge of the cage.

10. The flywheel of claim 1, wherein the magnet is formed to have a beveled edge, and wherein the cage comprises a surface in contact with the beveled edge.

11. The flywheel of claim 1, wherein the magnet is attached to the inside diameter surface at a predetermined distance from an axis of the disk portion.

12. The flywheel of claim 1, wherein the cage comprises an injection molded thermosetting plastic.

13. The flywheel of claim 12, further comprising a shutoff surface for an injection molding die formed on the disk portion proximate an edge of the cage.

14. The flywheel of claim 12, further comprising a shutoff surface for an injection molding die formed on the rim portion proximate an edge of the cage.

15. An electrical generator comprising:
    flywheel attached to a shaft;
    a depression formed in a top surface of the flywheel, the depression comprising a hole;
    a magnet attached to the flywheel;
    a cage in contact with the magnet and extending into the depression; and
    a stator disposed proximate the flywheel, the stator operable to conduct an induced electrical current as the magnet is moved relative to the stator by the rotation of the shaft.

16. The electrical generator of claim 15, wherein the depression comprises a groove.

17. The electrical generator of claim 15, wherein the depression comprises a groove formed in a rim portion of the flywheel, and wherein the cage extends into the groove.

18. The electrical generator of claim 15, wherein the depression comprises a groove formed in a disk portion of the flywheel, and wherein the cage extends into the groove.

19. The electrical generator of claim 15, further comprising a first groove formed in a rim portion of the flywheel and a second groove formed in a disk portion of the flywheel, and wherein the cage extends into both the first groove and the second groove.

20. The electrical generator of claim 15, further comprising an injection molding shutoff surface formed on the flywheel proximate an edge of the cage.

21. The electrical generator of claim 15, wherein the magnet is formed to have a beveled edge, and the cage comprises a surface in contact with the beveled edge.

22. The electrical generator of claim 15, wherein the magnet is attached to the flywheel at a predetermined distance from an axis of the flywheel.

23. The electrical generator of claim 15, wherein the cage comprises an injection molded thermosetting plastic.

24. The electrical generator of claim 23, further comprising a shutoff surface for an injection molding die formed on the flywheel proximate an edge of the cage.

25. A marine engine having a power unit, a flywheel connected to the power unit by a shaft, a magnet connected to the flywheel, and a stator proximate the flywheel for generating electricity as the magnet is moved past the stator as the shaft is rotated by the power unit, the improvement comprising;
    a depression formed in a rim top surface of the flywheel;
    a cage in contact with the magnet and extending into the depression and
    an injection molding shutoff surface formed on the flywheel proximate an edge of the cage.

26. The marine engine of claim 25, wherein the depression comprises a groove.

27. The marine engine of claim 25, wherein the depression comprises a hole.

28. The marine engine of claim 25, wherein the depression comprises a groove formed in a rim portion of the flywheel, and wherein the cage extends into the groove.

29. The marine engine of claim 25, wherein the depression comprises a groove formed in a disk portion of the flywheel, and wherein the cage extends into the groove.

30. The marine engine of claim 25, further comprising a first groove formed in a rim portion of the flywheel and a second groove formed in a disk portion of the flywheel, and wherein the cage extends into both the first groove and the second groove.

31. The marine engine of claim 25, wherein the magnet is formed to have a beveled edge, and wherein the cage comprises a surface in contact with the beveled edge.

32. The marine engine of claim 25, wherein the magnet is attached to the flywheel at a predetermined distance from an axis of the flywheel.

33. The marine engine of claim 25, wherein the cage comprises an injection molded thermosetting plastic.

34. The marine engine of claim 33, further comprising a shutoff surface for an injection molding die formed on the flywheel proximate an edge of the cage.

35. A product formed by the process of:
    forming a flywheel;
    forming a depression in a top surface of the flywheel;
    attaching a magnet to the flywheel;
    forming a cage to fit in contact with the magnet and a portion of the flywheel and into the depression; and
    forming an inside diameter surface and an outside diameter surface on the magnet;
    forming an inside diameter surface on the flywheel;
    joining the magnet and the flywheel together with an adhesive placed therebetween; and
    holding the inside diameter surface of the magnet at a predetermined diametrical position while the adhesive hardens.

36. The product formed by the process of claim 35, wherein the step of forming a depression comprises forming a groove.

37. The product formed by the process of claim 35, wherein the step of forming a depression comprises forming a hole.

38. The product formed by the process of claim 35, wherein the step of forming a cage further comprises:
    forming an injection molding shutoff surface on the flywheel;
    placing a die in contact with the shutoff surface to define an injection volume; and
    injecting material into the injection volume.

39. The product formed by the process of claim 35, further comprising the steps of forming a beveled edge on the magnet, and forming the cage to be in contact with the beveled edge.

40. The product formed by the process of claim 35, further comprising the steps of:
    mixing a plurality of balls of a predetermined size range with an adhesive;
    applying the adhesive between the magnet and the flywheel; and
    forcing the magnet and flywheel together as the adhesive hardens.

41. A method for retaining a magnet on a flywheel, the method comprising the steps of:
    forming a depression in a top surface of a flywheel;
    attaching a magnet to the flywheel;
    forming a cage in contact with the flywheel and the magnet and extending into the depression; and
    forming a groove in a disk portion of the flywheel, and forming the cage to extend into the groove.

42. The method of claim 41, wherein the step of forming a depression comprises forming a groove in the flywheel.

43. The method of claim 41, wherein the step of forming a depression comprises forming a hole in the flywheel.

44. The method of claim 41, further comprising the step of forming a groove in a rim portion of the flywheel, and forming the cage to extend into the groove.

45. The method of claim 41, further comprising the steps of:
    forming a first groove in a rim portion of the flywheel;
    forming a second groove in a disk portion of the flywheel; and
    forming the cage to extend into the first groove and the second groove.

46. The method of claim 41, further comprising the steps of:
    forming a beveled edge on the magnet; and
    forming the cage to contact the beveled edge.

47. The method of claim 41, wherein the step of attaching the magnet further comprises the steps of:
    forming an inside diameter surface and an outside diameter surface on the magnet;
    forming an inside diameter surface on the flywheel;
    joining the magnet and the flywheel together with an adhesive placed therebetween; and
    holding the inside diameter surface of the magnet at a predetermined diametrical position while the adhesive hardens.

48. The method of claim 41, further comprising the steps of:
    forming an injection molding shutoff surface on the flywheel;
    placing a die in contact with the shutoff surface to define an injection volume; and
    injecting material into the injection volume to form the cage.

49. The method of claim 41, further comprising the steps of:
    mixing a plurality of balls of a predetermined size range with an adhesive;
    applying the adhesive between the magnet and the flywheel; and
    forcing the magnet and flywheel together as the adhesive hardens.

50. A method of manufacturing a flywheel for an engine, the method comprising the steps of:
    forming a flywheel blank;
    forming a depression in a top surface of the flywheel blank;
    attaching at least one magnet to the flywheel blank;
    forming a cage in contact with the at least one magnet and extending into the depression; and
    forming a groove in a disk portion of the flywheel blank, and forming the cage to extend into the groove.

51. The method of claim 50, wherein the step of forming a depression comprises forming a groove in the flywheel blank.

52. The method of claim 50, wherein the step of forming a depression comprises forming a hole in the flywheel blank.

53. The method of claim 50, further comprising the step of forming a groove in a rim portion of the flywheel blank, and forming the cage to extend into the groove.

54. The method of claim 50, further comprising the steps of:
    forming a first groove in a rim portion of the flywheel blank;
    forming a second groove in a disk portion of the flywheel blank; and forming the cage to extend into the first groove and the second groove.

55. The method of claim 50, further comprising the steps of:

forming a beveled edge on the magnet; and forming the cage to contact the beveled edge.

56. The method of claim 50, wherein the step of attaching the magnet further comprises the steps of:

forming an inside diameter surface and an outside diameter surface on the magnet;

forming an inside diameter surface on the flywheel blank;

joining the magnet and the flywheel together with an adhesive placed therebetween; and holding the inside diameter surface of the magnet at a predetermined diametrical position while the adhesive hardens.

57. The method of claim 50, further comprising the steps of:

forming an injection molding shutoff surface on the flywheel blank;

placing a die in contact with the shutoff surface to define an injection volume; and injecting material into the injection volume to form the cage.

58. A method of attaching a magnet to a flywheel, the method comprising the steps of:

forming an inside diameter surface on a flywheel;

forming an inside diameter surface and opposed outside diameter surface on the magnet;

mixing a plurality of balls of a predetermined size range with an adhesive;

applying the adhesive between the magnet and the flywheel; and forcing the magnet and flywheel together as the adhesive hardens.

59. A marine engine having a power unit, a flywheel connected to the power unit by a shaft, a magnet connected to the flywheel, and a stator proximate the flywheel for generating electricity as the magnet is moved past the stator as the shaft is rotated by the power unit, the improvement comprising:

a depression formed in a disk portion of the flywheel; and a cage in contact with the magnet and extending into the depression.

60. The marine engine of claim 59, wherein the depression comprises a groove.

61. The marine engine of claim 59, wherein the magnet is attached to the flywheel at a predetermined distance from an axis of the flywheel.

62. A flywheel comprising:

a disk portion;

a rim portion attached to the disk portion and having an inside diameter surface;

a depression formed in the surface of at least one of the disk portion and the rim portion;

a magnet attached to the inside diameter surface; and a cage in contact with the magnet and extending into the depression;

wherein the depression comprises a hole.

63. A flywheel comprising:

a disk portion;

a rim portion attached to the disk portion and having an inside diameter surface;

a depression formed in the surface of at least one of the disk portion and the rim portion;

a magnet attached to the inside diameter surface; and a cage in contact with the magnet and extending into the depression;

wherein the disk portion further comprises a top surface, and wherein the depression comprises a groove formed in the top surface.

64. A flywheel comprising:

a disk portion;

a rim portion attached to the disk portion and having an inside diameter surface;

a depression formed in the surface of at least one of the disk portion and the rim portion;

a magnet attached to the inside diameter surface; and a cage in contact with the magnet and extending into the depression;

wherein the rim portion further comprises a top surface, and wherein the disk portion further comprises a top surface, further comprising:

a first groove formed in the top surface of the rim portion;

a second groove formed in the top surface of the disk portion; and wherein the cage extends into both the first groove and the second groove.

65. A flywheel comprising:

a disk portion;

a rim portion attached to the disk portion and having an inside diameter surface;

a depression formed in the surface of at least one of the disk portion and the rim portion;

a magnet attached to the inside diameter surface; and a cage in contact with the magnet and extending into the depression;

further comprising a first groove formed in the rim portion and a second groove formed in the disk portion, and wherein the cage extends into both the first groove and the second groove.

66. A flywheel comprising:

a disk portion;

a rim portion attached to the disk portion and having an inside diameter surface;

a depression formed in the surface of at least one of the disk portion and the rim portion;

a magnet attached to the inside diameter surface; and a cage in contact with the magnet and extending into the depression;

further comprising an injection molding shutoff surface formed on the disk portion proximate an edge of the cage.

67. A flywheel comprising:

a disk portion;

a rim portion attached to the disk portion and having an inside diameter surface;

a depression formed in the surface of at least one of the disk portion and the rim portion;

a magnet attached to the inside diameter surface; and a cage in contact with the magnet and extending into the depression;

further comprising an injection molding shutoff surface formed on the rim portion proximate an edge of the cage.

68. A flywheel comprising:

a disk portion;

a rim portion attached to the disk portion and having an inside diameter surface;

a depression formed in the surface of at least one of the disk portion and the rim portion;

a magnet attached to the inside diameter surface; and a cage in contact with the magnet and extending into the depression;

further comprising a shutoff surface for an injection molding die formed on the disk portion proximate an edge of the cage.

69. A flywheel comprising:

a disk portion;

a rim portion attached to the disk portion and having an inside diameter surface;

a depression formed in the surface of at least one of the disk portion and the rim portion;

a magnet attached to the inside diameter surface; and a cage in contact with the magnet and extending into the depression;

further comprising a shutoff surface for an injection molding die formed on the rim portion proximate an edge of the cage.

70. A marine engine having a power unit, a flywheel connected to the power unit by a shaft, a magnet connected to the flywheel, and a stator proximate the flywheel for generating electricity as the magnet is moved past the stator as the shaft is rotated by the power unit, the improvement comprising:

a depression formed in the flywheel; and a cage in contact with the magnet and extending into the depression;

wherein the depression comprises a hole.

71. A marine engine having a power unit, a flywheel connected to the power unit by a shaft, a magnet connected to the flywheel, and a stator proximate the flywheel for generating electricity as the magnet is moved past the stator as the shaft is rotated by the power unit, the improvement comprising:

a depression formed in the flywheel; and a cage in contact with the magnet and extending into the depression;

wherein the depression comprises a groove formed in a disk portion of the flywheel, and wherein the cage extends into the groove.

72. A marine engine having a power unit, a flywheel connected to the power unit by a shaft, a magnet connected to the flywheel, and a stator proximate the flywheel for generating electricity as the magnet is moved past the stator as the shaft is rotated by the power unit, the improvement comprising:

a depression formed in the flywheel; and a cage in contact with the magnet and extending into the depression;

further comprising a first groove formed in a rim portion of the flywheel and a second groove formed in a disk portion of the flywheel, and wherein the cage extends into both the first groove and the second groove.

73. A marine engine having a power unit, a flywheel connected to the power unit by a shaft, a magnet connected to the flywheel, and a stator proximate the flywheel for generating electricity as the magnet is moved past the stator as the shaft is rotated by the power unit, the improvement comprising:

a depression formed in the flywheel; and a cage in contact with the magnet and extending into the depression;

further comprising an injection molding shutoff surface formed on the flywheel proximate an edge of the cage.

74. A marine engine having a power unit, a flywheel connected to the power unit by a shaft, a magnet connected to the flywheel, and a stator proximate the flywheel for generating electricity as the magnet is moved past the stator as the shaft is rotated by the power unit, the improvement comprising:

a depression formed in the flywheel; and a cage in contact with the magnet and extending into the depression;

further comprising a shutoff surface for an injection molding die formed on the flywheel proximate an edge of the cage.

* * * * *

UNITED STATES PATENT AND TRADEMARK OFFICE
CERTIFICATE OF CORRECTION

PATENT NO. : 6,339,271 B1 Page 1 of 1
DATED : January 15, 2002
INVENTOR(S) : Mark Noble et al.

It is certified that error appears in the above-identified patent and that said Letters Patent is hereby corrected as shown below:

<u>Column 2,</u>
Line 8, insert the word -- a -- before "flywheel";
Line 25, insert -- invention. -- after the word "present";

Signed and Sealed this

Twenty-first Day of May, 2002

Attest:

*Attesting Officer*

JAMES E. ROGAN
*Director of the United States Patent and Trademark Office*